(12) United States Patent
English

(10) Patent No.: US 6,359,834 B1
(45) Date of Patent: Mar. 19, 2002

(54) MINE NEUTRALIZATION DEVICE

(75) Inventor: Thomas P. English, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/874,461

(22) Filed: Jun. 4, 2001

Related U.S. Application Data

(63) Continuation of application No. 09/770,793, filed on Jan. 29, 2001.

(51) Int. Cl.$^7$ .............................. G01S 11/14; G01S 5/14
(52) U.S. Cl. ...................................................... 367/133
(58) Field of Search .............................. 367/133, 134, 367/131; 89/1.13; 244/3.12; 114/316, 328, 330, 331, 338

(56) References Cited

U.S. PATENT DOCUMENTS 5,579,285 A * 11/1996 Hubert ........................ 367/133

FOREIGN PATENT DOCUMENTS

GB          2177352 A    *   1/1987

* cited by examiner

Primary Examiner—Daniel T. Pihulic
(74) Attorney, Agent, or Firm—Donald G. Peck; Harvey A. Gilbert

(57) ABSTRACT

A mine neutralization device (MND) is deployed from launch platform, such as an aircraft or surface craft, and travels several miles underwater to destroy a mine. Optical and/or acoustic command signals are coupled to the MND through an optical fiber and ambient water to control the MND on its way to the mine. The MND has a visible light system to illuminate the region around the MND, a camera system to provide optical data signals, and a sonar system to provide acoustic data signals transmitted to the launch platform. The optical and acoustic data signals are representative of images of features in the region to permit control signals from the platform to navigate the MND along the marine topography until the mine is located and identified. Once the mine is located and identified, explosives aboard the MND are detonated to destroy the mine.

18 Claims, 3 Drawing Sheets

MINE NEUTRALIZATION DEVICE

CROSS REFERENCE TO RELATED APPLICATION

This is a continuation of copending U.S. patent application entitled "Underwater Small Target Weapon" by Thomas P. English, U.S. Patent and Trademark Office Ser. No. 09/770,793 (NC 82586), filed Jan. 29, 2001 and incorporates all references and information thereof by reference herein.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to undersea devices to neutralize mines. More particularly, this invention provides an undersea vehicle deployed and controlled from a remote platform and relying on optical and sonar systems to locate and identify ordnance for destruction by onboard explosives.

Currently, there exists no effective mine neutralization capability in contemporary navies that allows for remote neutralization of mines at a safe standoff distance of several nautical miles for the crew of the launching platform. There is no capability for navigation, imaging, and identifying areas and mines underwater by a remotely deployed and operated unmanned deep diving submersible using a visible light source and camera system and on board sonar to effectively place and detonate an explosive charge to neutralize mines at significant depths.

Thus, in accordance with this inventive concept, a need has been recognized in the state of the art for a submersible guided to a mine from a remote control platform and using visible light and sonar to locate and identify the mine and destroy it.

SUMMARY OF THE INVENTION

The present invention provides a method of and apparatus for neutralizing mines underwater. The underwater weapon includes an by elongate housing containing a warhead section and having a spool of optical fiber disposed aft to deploy optical fiber from the housing during transit through water from a launch platform. Motor-driven propellers disposed aft on the housing and outside of the optical fiber provide propulsion through the water, and fins disposed aft on the housing, a vertical thruster, and the motor driven propellers are controlled by signals transmitted through the optical fiber and ambient water. The control signals are fed to an electronics section and a guidance and control section to steer the underwater weapon well below the surface of the water to a submerged mine. A source of visible light and an optical camera system and a sonar system forward on the housing provide for optical and acoustic detection, imaging, and identification of a submerged mine. Preprogrammed and/or remote control signals direct the undersea weapon to the mine and an onboard explosive charge is detonated to destroy the mine.

An object of the invention is to provide a method of and apparatus for neutralizing mines capable of being remotely guided and navigated underwater from a remote launch platform.

Another object of the invention is to provide method of and apparatus for neutralizing mines by detonating onboard ordnance at a safe standoff distance of several miles from a launch platform.

Another object is to provide a method of and apparatus for neutralizing mines that provides remote visual and/or acoustic inspection of a mine prior to destruction.

Another object of the invention is to provide a method of and apparatus for neutralizing mines capable of being navigated underwater from a remote launch platform to image, detect and identify mines underwater by optical and sonar means and destroy them with onboard explosives.

Another object of the invention is to provide a method of and apparatus for neutralizing mines having a source of optical light and camera system and sonar system to locate, identify, and destroy mines under the conditions of low-light found at depths below five hundred feet in the ocean.

These and other objects of the invention will become more readily apparent from the ensuing specification when taken in conjunction with the appended claims.

DESCRIPTION OF THE PREFERRED EMBODIMENT

Figure 1:
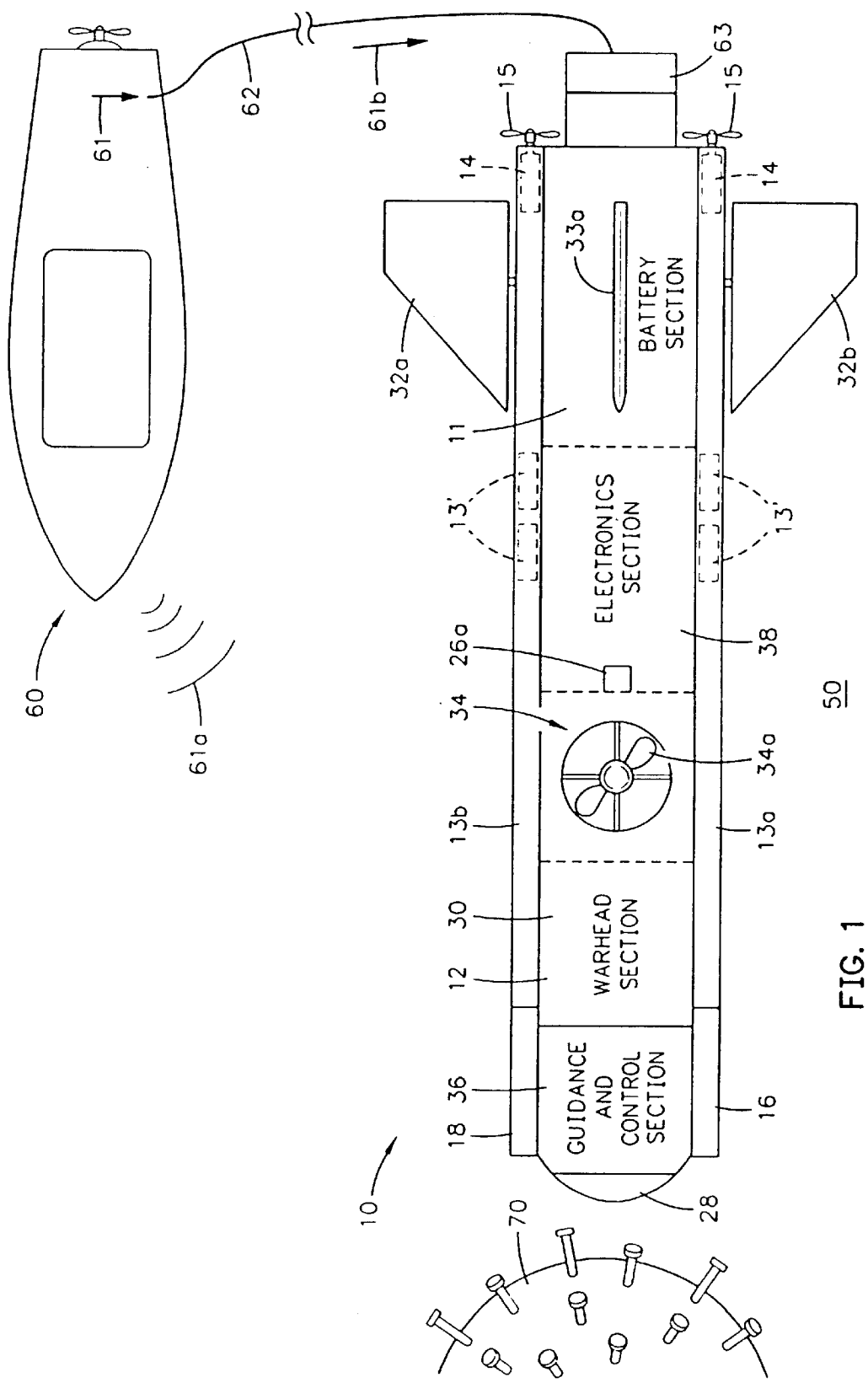
FIG. 1 is a schematic top view of the mine neutralization device of this invention.
Figure 2:
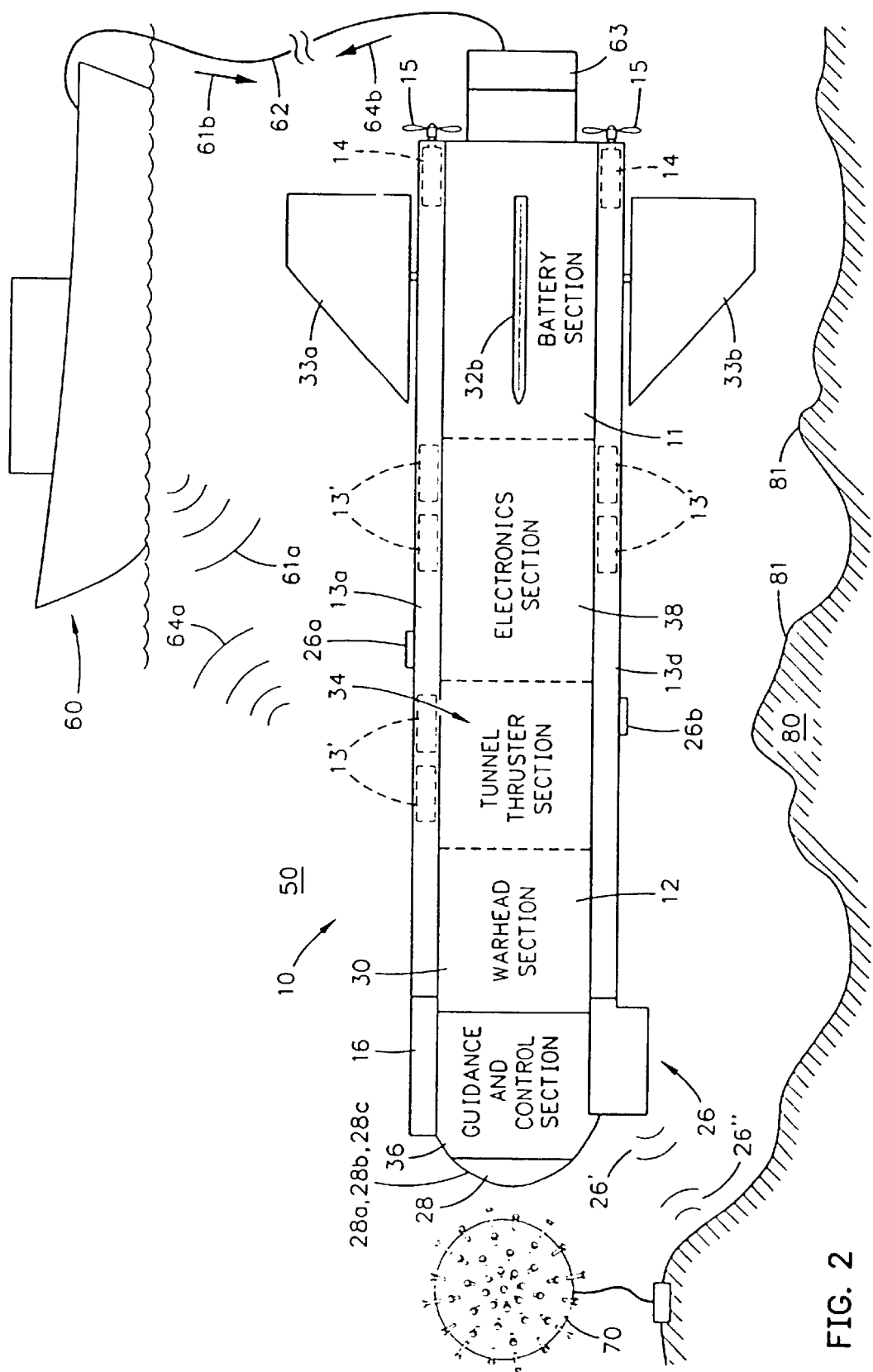
FIG. 2 is a schematic side view of the mine neutralization device of this invention.
Figure 3:
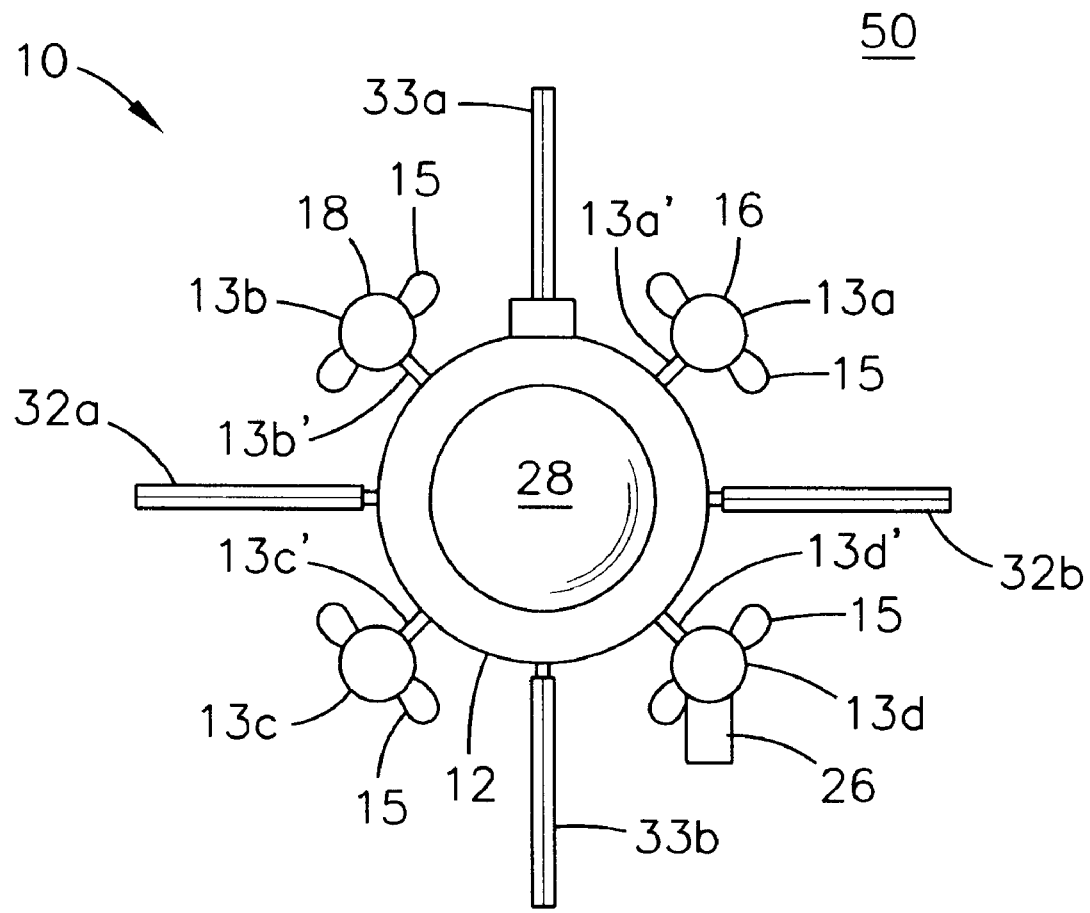
FIG. 3 is an end view of the mine neutralization device.

Referring to FIGS. 1, 2, and 3, mine neutralization device (MND) 10 of this invention is an unmanned submersible controlled during its submerged transit from a remote launch platform 60 to a submerged mine 70 or field of mines 70. MND 10 is detonated to destroy mine 70 that can be a bottom mine; close tethered mine, in-volume mine, or floating mine.

MND 10 is compact enough to be transported by and deployed from launch platform 60. Remote platform 60 can be an aircraft, such as a hovering helicopter, or a surface craft that deploys, (drops) MND 10 into water 50, and it progresses underwater on its own to complete a mission up to several nautical miles from the launch point. When an aircraft is used, MND 10 is lowered into water 50, or it may have an interconnected parachute that slows descent to reduce the possibility of damage and disengages during entry in the water.

Command signals 61 can be transmitted from remote platform 60 to MND 10 as it progresses on a mine-hunting mission. Command signals might be acoustic command signals 61a transmitted through ambient water 50, and/or optical command signals 61b in optical fiber 62 that spools-off from spool 63 on MND 10 as it proceeds onward. Command signals 61 can be used to bring MND 10 to within a lethal radius of mine 70 where detonation of MND 10 could destroy mine 70, or to bring MND 10 to the vicinity of mine 70 where other systems to be described can be used to gather data.

MND 10 has an elongate cylindrically-shaped housing 12. Housing 12 is made from metal or synthetic materials having sufficient strength to serve as an elongate pressure-hull that bears pressures exerted by ambient water 50. Not only is pressure-hull housing 12 strongly built to resist and withstand the high pressures expected at depth in ambient water 50, but the other components to be described herein also are substantially built and sealed to reduce the effects of ambient water pressure. All components and manners of interconnection are fabricated in accordance with sound marine engineering principles for successful operation during missions to neutralize mines at depths in deep submergence regions that may be well in excess of five hundred feet.

Four waterproof elongate pylons 13a, 13b, 13c, and 13d are symmetrically mounted about housing 12 on struts 13a', 13b', 13c', and 13d'. The pylons and struts longitudinally extend the length of housing 12. Pylons 13a, 13b, 13c, and 13d each contain batteries 131 and may contain some electronics for control purposes. Batteries 13' may be appropriately coupled through the struts into housing 12 to power sections and modules to be described. Each of pylons 13a, 13b, 13c, and 13d houses an electric motor 14 for rotating a propeller 15 located aft on housing 12. Each electric motor 14 is electrically connected through the struts to battery section 11 inside housing 12 for power to propel MND 10 and, optionally, can be coupled to batteries 13' in the pylons.

A sealed camera system 16 is mounted forward on pylon 13a on housing 12, and a sealed source of visible light 18 is mounted forward on pylon 13b on housing 12. As MND 10 progresses to the region of mine 70, light source 18 can be turned on to illuminate not only the area in front of MND 10 but also marine topography 80 and features 81 of interest at the bottom of ambient water 50. Light source 18 radiates high levels of intensity of visible illuminating light to enable camera system 16 to clearly sense images of features 81 and mine 70 even at considerable depths where little, if any, sunlight reaches.

Camera system 16 has a combination of optical sensing and imaging components to receive the reflected portions of visible light radiated from light source 18. The appropriate imagers, receivers, detectors, etc., of camera system 16 may be located in camera system 16 on pylon 13b, and/or they may be located inside housing 12 and suitably connected to appropriate lenses, optical fibers, waveguides, and other appropriate conductors of visible radiation in camera system 16.

The visible light sensor of camera system 16 (camera or detector, for example) receives reflected portions of the visible radiation, and camera system 16 provides optical data signals representative of ambient features 81 for appropriate processing in MND 10. This capability enables MND 10 to avoid obstacles, to follow a series of known features 81, and/or to locate and identify mine 70. These optical data signals may be fed to processing, logic, and relay modules (not shown) in electronics section 38 in housing 12 and transmitted as optical data signals 64b on optical fiber 62 to remote platform 60 or acoustic data signals 64a through water 50. Since MND 10 is usually submerged to a considerable depth in water 50, its submerged bulk and the light from visible light source 18 are hidden from observers above water 50 during a mission as data is exchanged.

A sonar system 26 is mounted at the lower forward part of housing 12 on pylon 13d and has at least one transducer to project acoustic energy 26" through water 50 forward of MND 10. The projected acoustic energy functions to ensonify the region forward of MND 10 with acoustic energy similarly to illuminating the area with visible light from a visible light source; however, ensonification involves the projection of acoustic energy whereas illumination involves the radiation of visible light. The same transducer, or at least one other transducer of sonar system 26 (a hydrophone) receives reflected portions 26" of the ensonifying acoustic energy to provide acoustic data signals representative of marine features 81 of the marine topography 80 and mine 70.

Sonar system 26 operates in the active mode within predetermined bandwidths and can be restricted in range to about one hundred meters to provide acoustic data signals that give sufficient resolution to recognize features 81 and mine 70. An operator on remote launch platform 60 can follow a path of recognizable features and send acoustic control signals 61a and optical control signals 61b to steer, or navigate MND 10 along these features to mine 70. MND 10 also can maneuver in a search pattern, and use sonar system 26 (and camera system 16) to find, recognize, and home in on mine 70 when it is far removed from features 81, for example where mine 70 is floating or tethered and is located far above the bottom.

Transducers of sonar system 26 and internal processor modules in electronics section 38 of sonar system 26 additionally permit acoustic communications to and from remote platform 60 and other stations by transmitting acoustic data signals 64a and receiving acoustic command signals 61a. Sonar system 26 may also include a secondary sonar system 26a having appropriate transducers for projecting and receiving particular acoustic signals that are more capable of communications over greater distances, e.g. to platform 60. Sonar system 26a is mounted on the top, rear part of housing 12 and is coupled to internal processor modules in electronics section 38 of sonar system 26. Sonar system 26 may include yet another sonar system 26b (echo sounder) on the ventral side of MND 10 that is coupled to internal processor modules in electronics section 38 to indicate depth of features 81 of marine topography 80 from MND 10.

The information of the received data signals from camera system 16 and sonar systems 26, 26a, and 26b, can be utilized separately or in combination by onboard processing modules in electronics section 38 for navigation, avoidance of obstacles, imaging, and identifying mine 70. The acoustic and optical information can be appropriately transformed and transmitted back to platform 60 as part of the signals of acoustic data signals 64a and/or optical data signals 64b. However, usually the acoustic data signals 64a from sonar systems 26 and 26a are transmitted through water 50, and optical data signals 64b are transmitted over optical fiber 62.

An impact switch, or contact detonator 28a in a detonator section 28 is located forward on housing 12. When MND 10 is driven into mine 70, contact detonator 28a of detonator section 28 initiates detonation of warhead section 30. Warhead section 30 can be a bulk or shaped charge of many different kinds of explosives with appropriate fusing, detonators, and boosters to detonate reliably and disable or destroy mine 70. Detonator section 28 or warhead section 30 can additionally include a proximity detonator 28b to detonate warhead section 30 when the received reflected acoustic data signals do indicate that MND 10 is within the proximity, or lethal radius of target 70. Detonator section 28 or warhead section 30 could include yet another detonator 28c that is initiated to detonate warhead section 30 when an appropriate command signal 61a or 61b is received at MND 10. This gives an operator in remote platform 60 the option to detonate warhead section 30 at mine 70 or at some other time.

MND 10 is guided by command signals 61a and 61b to impact and destroy mine 70 by controlling pivotable horizontal control fins 32a and 32b, pivotable vertical control fins 33a and 33b, and vertical 10 tunnel thruster section 34. The four control fins 32a, 32b, 33a, and 33b are symmetrically, mounted aft about housing 12. Fins 32a and 32b are selectably rotated by interconnected electric motors (not shown) separately or together about a horizontal axis through MND 10, and fins 33a and 33b are selectably rotated by interconnected electric motors (not shown) separately or together about a vertical axis through MND 10. Thus, each of control fins 32a, 32b, 33a, and 33b may be selectably rotated so that MND 10 can turn, bank, pitch, roll, dive, and climb as it progresses to mine 70. These control fins can also have flaps and vented surfaces for additional control surfaces if desired.

MND 10 increases its maneuverability with vertical tunnel thruster section 34. Vertical tunnel thruster section 34 can be a shrouded electric motor-driven single propeller or counter rotating propeller assembly 34a to hover MND 10 while it is stopped and not proceeding forward. In addition, tunnel thruster section 34 can augment the controlled upward and downward motions of MND 10 that are created by rotation of horizontal fins 32a and 32b while MND 10 is in transit. Appropriate rotation of propeller assembly 34a of thruster section 34 can sustain, or hover MND 10 at a desired depth near features 81 of marine topography 80, or mine 70. This feature permits camera system 16 and sonar system 26 to closely approach, inspect, and accurately identify mine 70.

In addition to the selective control of MND 10 attributed to fins 32a, 32b, 33a, and 33d and tunnel thruster section 34, electric motors 14 can be selectively controlled to change and/or reverse the rotation of propellers 15. Propellers 15 are symmetrically mounted aft about housing 12 in-line with pylons 13a, 13b, 13c, and 13d to help precisely control MND 10. Propellers 15 are located radially outwardly from optical fiber spool 63 to avoid breaking optical fiber 62 as it spools-off during transit of MND 10. However, while reversible, controllable propellers 15 can further augment maneuvering of MND 10, care must be exercised not to sever optical fiber 62. Actuating signals for the motors connected to fins 32a, 32b, 33a, and 33b, tunnel thruster section 34 and propellers 15 are created in guidance and control section 36.

Guidance and control section 36 generates actuating signals in response to internal control signals created in electronics section 38. In accordance with systems known in the art, actuating signals from modules in guidance and control section 36 effect responsive displacements of electric motors connected to fins 32a, 32b, 33a, and 33b, tunnel thruster section 34, and propellers 15. MND 10 is steered and guided by these displacements in direction, speed, depth, and maneuvers to mine 70. Section 36 and the motors connected to the fins, thruster, and propellers are powered through suitable connections extending to battery section 11 and batteries 13'.

Electronics section 38 in housing 12 has processing and logic modules (not shown) coupled to receive the data signals from camera system 16 and sonar system 26. The processing and logic modules included in electronics section 38 are well known in the art and are included in MND 10 to process incoming data signals from camera system 16 and sonar system 26 and create appropriate internal control signals that are fed to guidance and control section 36. Electronics section 38 additionally has processing, logic and transceiver modules responsive to receive acoustic command signals 61a received by hydrophone transducers of sonar systems 26 and 26a and optical command signals 61b received over optical fiber 62. When these command signals reach electronics section 38, its processing and logic modules create internal control signals for guidance and control section 36 for generation of actuating signals. These actuating signals responsively steer and guide MND 10 to mine 70.

MND 10 is an underwater weapon carried to the region of mine 70 by airborne or surface platform 60 to deliver warhead section 30 to neutralize mine 70 and other targets of opportunity. After being deployed from platform 60, MND 10 has sufficient power in battery section 11 and batteries 13' to travel several nautical miles underwater. MND 10 may be controlled by command signals 61 from platform 60 during the first phase of its run. During the terminal phase of its run to mine 70, sonar module 26 may be activated to acquire and home in on mine 70. In order to traverse the distance from platform 60 to mine 70, electronics section 38 of MND 10 may utilize GPS signals representative of the locations of launch platform 60 and mine 70 just before MND 10 is launched. Electronics section 38 then provides, or creates appropriate internal control signals for guidance and control section 36. Based on these GPS signals the operator in platform 60 could also generate and transmit the appropriate command signals 61 as acoustical command signals 61a through water 50 and/or optical command signals 61b through optical fiber 62 to direct MND 10 to the location of mine 70.

Operational deployment of MND 10 begins with coming within range of mine or minefield 70, separating MND 10 a safe distance from launch platform 60, and powering-up MND 10. During this procedure, MND 10 is underwater and cannot be seen, while an operator on launch platform 60 performs a series of tests to check the functions of MND 10. Appropriate modules in sections 11, 30, 34, 36, and 38 in MND 10 can be preprogrammed and/or activated to enable MND 10 to run a predetermined, preprogrammed course to mine 70. At the safe standoff distance that is beyond the distance that the explosion of warhead 48 section 30 can be tolerated at launch platform 60, a safe and arm mechanism associated with warhead section 30 begins to arm it. When complete, the operator sends command signals 61a and 61b to initiate motor-driven propellers 15 and dive MND 10 deep into water 50.

Since an undetected approach to mine 70 is better, command signals 61a and 61b can be sent to MND 10 to take it to and proceed at a depth near features 81 of marine topography 80 at the bottom of ambient water 50. Echo sounder system 26b will help provide data signals to assure this depth is maintained. Virtually real-time acoustic data signals 64a and optical data signals 64b are being sent through water 50 and/or optical fiber 62 from MND 10 to platform 60. The operator observes the data on displays and responsively navigates MND 10. As MND 10 is within a predetermined range to mine 70 for terminal homing by sonar system 26, electronics section 38 automatically initiates a terminal run to mine 70. MND 10 may detonate warhead 30 on contact with mine 70, or detonation can be controlled by command signals 61 from the operator on platform 60.

MND 10 can operate in an automatic or manual mode to neutralize mines 70. The automatic mode uses GPS signals representative of the locations of mine 70 and platform 60. These GPS signals are preprogrammed in electronics section 38 on platform 60 for navigation most of the way to mine 70. Light source 18 and camera system 16 and sonar system 26 provide tactical information to guide MND 10 to mine 70 during the terminal phase. Contact of contact detonator 28a of detonation section 28 with mine 70 initiates detonation of warhead section 30 in the automatic mode, although automatic proximity detection by proximity detonator 28b might be relied on.

In the manual mode the operator on platform 60 controls MND 10 all the way to mine 70 and then initiates detonation of the weapon from an onboard control console (not shown). Once MND 10 is deployed from platform 60, the four displays of the control console (the tactical display, touch screen, sonar display, and video display) allow control of MND 10 for the entire mission. The tactical display provides a scenario including, position, attitude, and status of MND 10, mine 70 (or desired GPS location of mine 70), sonar search sector of MND 10, and environmental data. The touch screen allows control of MND 10 during all phases of the mission. The sonar display can be activated for active search format, or can provide a passive capability for some mines. The sector azimuth of sonar system 26 can be selected during run out of MND 10 and may be progressively narrowed as MND 10 approaches closer to mine 70. Signals representative of the video display usually are sent from MND 10 via optical data signals 64b over optical fiber 62.

In either mode acoustic data signals of sonar system 26 can provide for underwater navigation when the operator decides to navigate using a known path of underwater landmarks and features. Camera system 26 provides optical data signals from the depths on and around features 81 of marine topography 80. The acoustic data signals and optical data signals obtained by high-energy illumination at depths by visible light source 16 give acceptable resolution of features 81 and positive location and identification of mine 70 for informed decisions.

The accurate tracking provided by visual, or optical monitoring via light source 18 and camera system 16 and acoustic monitoring via sonar system 26 can be done intermittently or continuously on the way to mine 70. Once MND 10 is in close proximity to mine 70, the operator can survey it via camera system 16. Vertical tunnel thruster section 34 and other control surfaces provide for precise station keeping, or hovering to permit detailed inspection of mine 70. The operator can then send the command signal to detonate warhead section 30 or move MND 10 to another site.

Having the teachings of this invention in mind, modifications and alternate embodiments of this invention may be adapted. MND 10 can be made in many different sizes and configurations for reliable operation in different operational scenarios. MND 10 might also be used for round-trip missions such as, the unobserved inspection, surveillance or delivery of packages, ordnance, electronics, supplies, etc.

The disclosed components and their arrangements as disclosed herein all contribute to the novel features of this invention. MND 10 provides a covert, quick and cost-effective way to destroy mines and other ordnance as well as other items without introducing the unnecessary complications associated with being observed, or exposing personnel to danger. Therefore, MND 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

I claim:

1. A method of neutralizing a mine comprising the steps:
providing a submersible having an elongate cylindrically-shaped pressure-hull housing mounting a plurality of longitudinally extending pylons thereon;
propelling said submersible through ambient water from a launch platform by motor-driven propellers disposed aft on said pylons;
deploying an optical fiber from a spool of optical fiber on said housing during transit through said ambient water;
illuminating an area forward of said housing with visible light radiated from a source of visible light mounted forward on one of said pylons;
receiving reflected portions of said visible light to provide representative optical data signals in a camera system mounted forward on one of said pylons;
projecting acoustic energy from a sonar system mounted forward on one of said pylons through said ambient water;
receiving reflected portions of said projected acoustic energy by said sonar system to provide representative acoustic data signals;
processing signals in an electronics section in said housing to generate internal control signals therein;
coupling said internal control signals to a guidance and control section in said housing;
generating actuating signals in said guidance and control section in response to said internal control signals;
coupling said actuating signals to effect displacement of motors connected to a plurality of fins disposed aft on said housing, a vertical thruster section extending through said housing, and said motor-driven propellers;
steering said submersible in said ambient water to a mine by said fins, said vertical thruster section and said propellers by said actuating signals; and
detonating a warhead in said housing to destroy said mine.

2. A method according to claim 1 further comprising the step of:
transmitting optical control signals from said platform to said submersible and said optical data signals from said submersible to said platform through said optical fiber.

3. A method according to claim 2 further comprising the step of:
transmitting acoustic command signals from said launch platform to said sonar system on said submersible and said acoustic data signals from said sonar system on said submersible to said launch platform through said ambient water.

4. A method according to claim 3 wherein said step of processing by said electronics section includes the steps of:
receiving said optical data signals from said camera system, said acoustic data signals from said sonar system, said acoustic command signals received by said sonar system, and said optical command signals received over said optical fiber; and
creating said internal control signals therefrom.

5. A method according to claim 4 wherein said step of illuminating includes the step of:
radiating visible light onto said mine and features of marine topography at the bottom of said ambient water to effect visible illumination thereof; and
said step of projecting includes the step of:
ensonifying said mines and said features with acoustic energy.

6. A method according to claim 5 wherein said step of detonating comprises the step of:
contacting a contact detonator in said housing with said mine to detonate said warhead.

7. A method according to claim 5 wherein said step of detonating comprises the step of:
detonating a proximity detonator in said warhead at a lethal proximity of said mine to detonate said warhead.

8. A method according to claim 6 further comprising the step of:

operating said electronics section and guidance and control section in a programmed automatic mode of guidance to said mine and detonation of said warhead at said mine.

9. A method according to claim 6 further including the step of:

operating said electronics section and guidance and control section in a manual mode of operation by an operator in said launch platform sending command signals to transit to said target and detonate said warhead section.

10. A unmanned device for neutralizing a mine comprising:

an elongate cylindrically-shaped pressure-hull housing having a plurality of pylons mounted to longitudinally extend thereon;

a warhead section in said housing;

a spool of optical fiber disposed aft on said housing to deploy optical fiber from said housing during transit through ambient water from a launch platform;

motor-driven propellers disposed aft on pylons on said housing radially outwardly from said spool of optical fiber to propel said housing through said ambient water;

a plurality of fins disposed aft on said housing;

a vertical thruster section extending through said housing having a propeller assembly;

a source of visible light mounted forward on one of said pylons to radiate visible light to illuminate an area in front of said housing in said ambient water;

a camera system mounted forward on one of said pylons to receive reflected portions of said radiated visible light and to provide representative optical data signals;

a sonar system mounted forward on one of said pylons to project acoustic energy signals and receive reflected portions of said projected acoustic energy to provide representative acoustic data signals;

an electronics section in said housing coupled to receive said representative optical data signals and acoustic data signals;

a guidance and control section in said housing coupled to said electronics section and to said fins, said motor driven propellers, and said vertical thruster, said motor driven propeller, said fins, and said electronics section, said fins, said motor driven propellers, and said vertical thruster section, said fins, said motor driven propellers, and said propeller assembly being controlled by said electronics section and said guidance and control section to steer through ambient water during transit to a mine and to detonate said warhead section at said mine.

11. A device according to claim 10 wherein said optical fiber receives optical control signals from and transmits said optical data signals to said launch platform to permit optical communication therethrough, and said sonar system receives acoustic command signals from and transmits said acoustic data signals to said launch platform to permit acoustic communication through said ambient water.

12. A device according to claim 11 wherein said electronics section has processing and logic modules coupled to receive said optical data signals from said camera system and said acoustic data signals from said sonar system to create internal control signals, and said electronics section has processing, logic and transceiver modules responsive to said acoustic command signals received by said sonar system and optical command signals received over said optical fiber to create internal control signals.

13. A device according to claim 12 wherein said guidance and control section generates actuating signals in response to internal control signals and said actuating signals are coupled to effect displacement of motor connected to said fins, said tunnel thruster section, and said motor driven propellers to effect responsive displacements thereof.

14. A device according to claim 13 wherein said radiated visible light radiates to visibly illuminate said mine and said projected acoustic energy acoustically ensonifies said mine.

15. A device according to claim 14 wherein said radiated visible light radiates to visibly illuminate features of marine topography at the bottom of said ambient water and said projected acoustic energy acoustically ensonifies said features.

16. A device according to claim 15 further comprising:

a contact detonator forward in said housing to detonate said warhead section upon contact with said mine.

17. A device according to claim 16 further comprising:

a proximity detonator in said warhead section preset to detonate said warhead section at a lethal proximity of said mine.

18. A device according to claim 17 wherein said electronics section and guidance and control section are operable in a programmed automatic mode of guidance to detonate said warhead section at said mine, and said electronics section and guidance and control section are operable in a manual mode of operation by an operator in said launch platform sending command signals to transit to said target and detonate said warhead section.

* * * * *